UNITED STATES PATENT OFFICE.

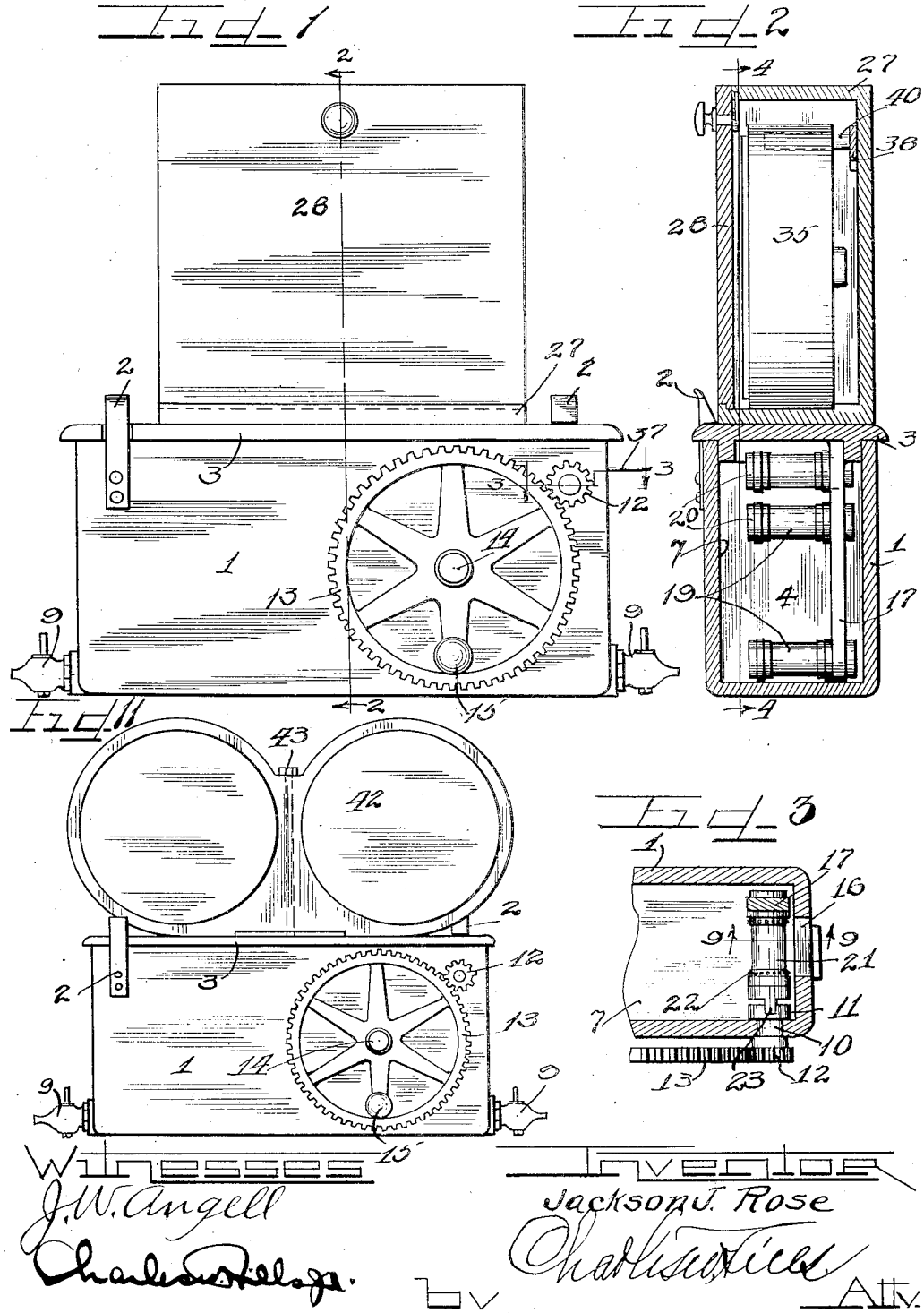

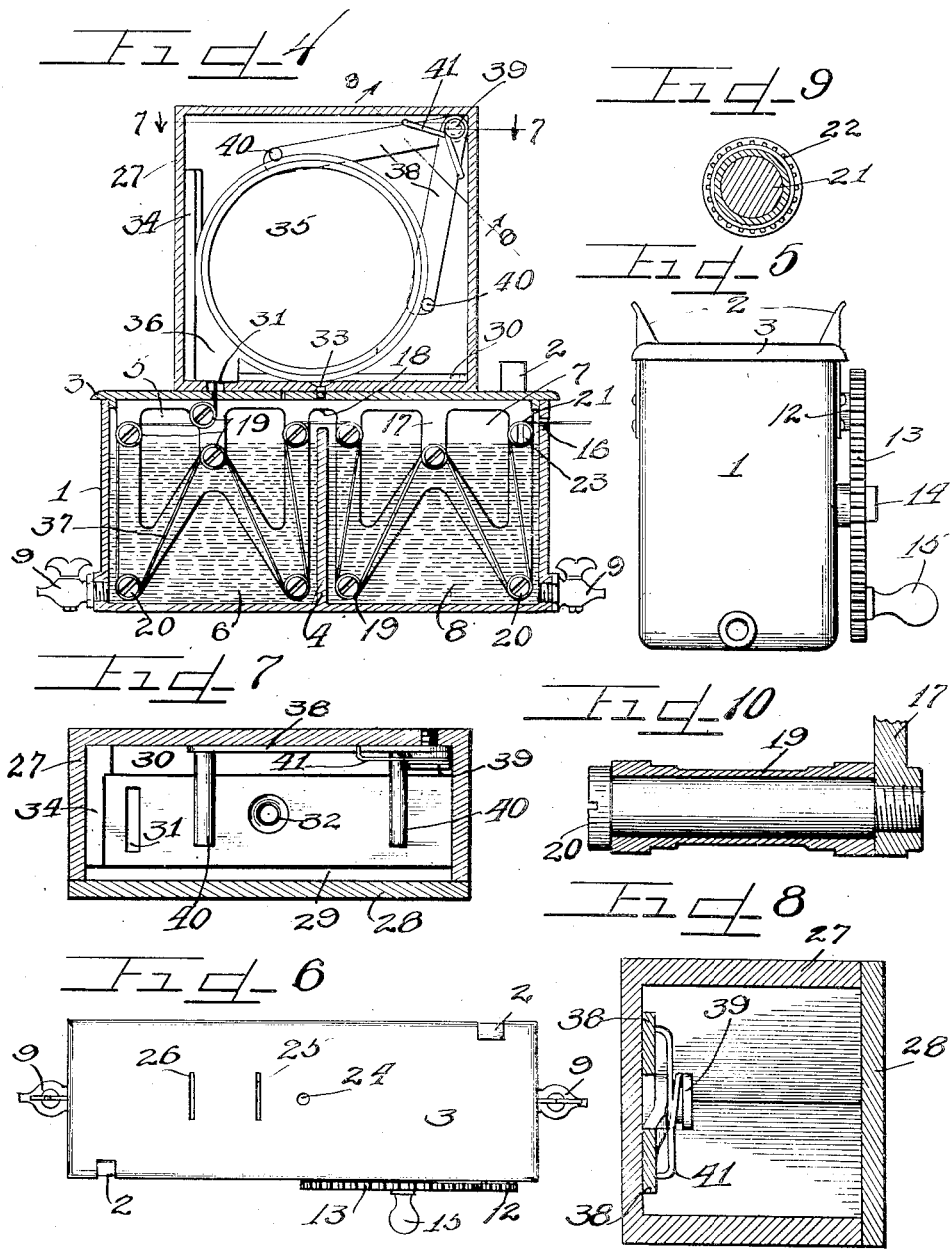

JACKSON J. ROSE, OF CHICAGO, ILLINOIS.

CAMERA-FILM DEVELOPING TANK AND TESTER.

1,364,320.　　　　Specification of Letters Patent.　　Patented Jan. 4, 1921.

Application filed November 22, 1918. Serial No. 363,696.

*To all whom it may concern:*

Be it known that I, JACKSON J. ROSE, a citizen of the United States, and a resident of the city of Chicago, in the county of Cook and State of Illinois, have invented certain new and useful Improvements in Camera-Film Developing Tanks and Testers; and I do hereby declare that the following is a full, clear, and exact description of the same, reference being had to the accompany drawings, and to the numerals of reference marked thereon, which form a part of this specification.

In cinematograph work it frequently becomes necessary to produce or take position pictures in natural locations which very often are at considerable distances from the regular moving picture studios where most of the pictures are taken. It is now the practice in taking position pictures to transport all the necessary paraphernalia and the actors to the selected locations in order to get the desired moving pictures. This entails considerable expense which very often must be incurred several times for the reason that the films taken at the selected locations are not developed until after the actors have returned to the studios and all the equipment has been sent back. If when the films are finally developed they are found to be unfit for use it of course necessitates retaking of the film and additional expense.

This invention relates to an improved type of a motion picture film tester adapted to be readily used when position pictures are taken at considerable distances from the regular studios, and affords a convenient means whereby samples of films taken at different places may be rapidly developed at the time of taking to ascertain whether or not they are satisfactory, before the actors leave the place and the equipment is returned.

It is an object of this invention to construct a portable motion picture film tester.

It is also an object of the invention to provide a motion picture film tester adapted to removably receive a motion picture camera film magazine mounted thereon for the purpose of developing a small portion of the film immediately after the taking of a motion picture.

Another object of the invention is the construction of a motion picture film tester wherein a developing and fixing tank is provided with a removable frame carrying cover adapted to removably receive a camera film magazine thereon to afford a ready means for developing a small portion of the film in the magazine before the entire film is developed.

A further object of this invention is the construction of a motion picture film tester wherein a chambered developing and fixing tank is provided with an external mechanism adapted for feeding through the tank a test length of a motion picture film engaged around the rotatable rollers of a removable cover frame on which the camera film magazine is engaged.

It is furthermore an object of the invention to provide a motion picture film tester whereon a camera film magazine may be removably mounted to permit a short length of the exposed film contained therein to be conducted through developing and fixing chambers to develop the same when position pictures are taken away from a studio, to ascertain whether or not the taken film is satisfactory before the equipment and actors leave the place.

It is an important object of this invention to provide a simple and inexpensive motion picture film tester adapted to removably receive either a single or a double camera film magazine mounted thereon for the purpose of testing short lengths of exposed films when position pictures are taken away from a studio so that a picture may be retaken if necessary before the people and equipment used leave the place, thus reducing the expense of production.

Other and further important objects of this invention will be apparent from the disclosures in the specification and drawings.

The invention (in a preferred form) is illustrated in the drawings and hereinafter more fully described.

On the drawings:

Figure 1 is a front elevation of a film tester embodying the principles of this invention.

Fig. 2 is a section taken on line 2—2, of Fig. 1, showing parts in elevation.

Fig. 3 is a fragmentary detail section taken on line 3—3, of Fig. 1, with parts in elevation.

Fig. 4 is a sectional view taken on line 4—4, of Fig. 2.

Fig. 5 is an end view of the device with the film magazine removed.

Fig. 6 is a top plan view thereof.

Fig. 7 is a sectional view taken on line 7—7, of Fig. 4.

Fig. 8 is a detail section taken on line 8—8, of Fig. 4.

Fig. 9 is an enlarged detail section on line 9—9, of Fig. 3, with parts omitted.

Fig. 10 is an enlarged detail section taken longitudinally through one of the film guide rollers.

Fig. 11 is a front elevation of the device showing a double film magazine mounted thereon.

As shown on the drawings:

The reference numeral 1, indicates a container, casing or tank open at the top and provided with upwardly projecting spring clasps or clamps 2, on opposite sides thereof for removably holding a notched top plate or cover 3, seated in position to close the tank. Integrally formed or rigidly secured transversely through the middle portion of the tank 1, is a wall or partition 4, which extends to within a short distance of the top of the tank and divides the same into a developing chamber 5, for holding a developing liquid 6, and a fixing chamber 7, for holding a solution of sodium hyposulfite or other fixing solution 8. An outlet faucet or pet cock 9, is provided at the lower portion of each end wall of the tank 1, to afford a means for readily draining the solutions 6 and 8, from the respective compartments or chambers 5 and 7, when it becomes necessary to empty the tank.

A pin or stub shaft 10, is rotatably mounted in the upper right hand corner of the front wall of the tank 1, and integrally formed on the inner end of said shaft 10, is a diametrically slotted head 11. Keyed or otherwise secured on the outer projecting end of the shaft 10, is a small gear or pinion 12, which meshes with a large gear wheel 13, rotatably mounted on a pin or bolt 14, secured in the front wall of the tank.

A knob or handle 15, is secured to the large gear wheel 13, near the periphery thereof to afford a means whereby the gear wheel may be readily turned. A horizontal slot 16, is provided in the upper portion of the outer end wall of the fixing chamber 7.

Rigidly secured longitudinally across the rear portion of the inner face of the cover 3, is an apertured flat frame 17, provided centrally with a slot 18, open at the lower end to permit the frame when in position within the tank to engage over the partition 4, so that one half of the frame is adapted to fit into the tank chamber 5 and the other half into the tank chamber 7, as shown in Fig. 4, with the lower portions of the frame surrounded by the developing and fixing solutions 6 and 8 respectively.

A plurality of parallel spools or guide rollers 19, are rotatably engaged at right angles on the front surface of the frame 17, by means of screw bolts 20, the inner threaded ends of which are threaded into threaded apertures provided for the purpose in the frame. The guide rollers 19, are so spaced with respect to one another to permit a ribbon film to be trained therearound to follow a zigzag or circuitous path through the chambers 5 and 7, of the tank, as hereinafter more fully described. Transversely disposed within the upper right hand corner of the fixing chamber 7, is a master or feed roller 21, which is supported on the frame 17, and has sprockets 22, formed at each end of the shank portion thereof, as clearly shown in Fig. 3. The outer end of the feed roller 21, is provided with a diametrical tongue, projection or lug 23, adapted to engage in the grooved head 11, when the device is assembled, to permit rotation of the feed roller 21.

As shown in Fig. 6, the cover 3, is provided with a central threaded aperture 24, and two transverse slots 25 and 26, respectively provided in that portion of the cover which is disposed above the developing chamber 5.

Positioned upon the top of the cover 3, is a box or casing 27, provided with a removable front board or door 28. Secured upon the inner surface of the bottom of the box 27, along the front and rear margins is a front retaining strip 29, and a rear retaining strip 30. A transverse slot 31, is also provided in the bottom of the box 27, in a position to register with the cover slot 26. A reamed opening 32, is provided centrally in the bottom of the box, and is adapted to register with the threaded opening 24, in the tank cover. A screw 33, projects through the box opening 32, and is threaded into the cover opening 24, for the purpose of securing the box upon the cover. A grooved guide strip 34 is rigidly secured in a vertical position against the inner surface of the left end wall of the box 27, and together with the strips 29 and 30, forms suitable grooves for receiving a single film magazine 35, to hold the same against lateral movement within the box. The film magazine 35, may be of any of the standard types, and when positioned within the box, the slotted outlet tube 36, of the magazine is placed so that the slot therein registers with the slots 31 and 26, to permit a motion picture ribbon film 37, to be threaded through said registering slots.

Two levers or arms 38, overlapping at one end are pivotally mounted in one of the upper corners of the box 27, by means of a bolt or stud 39, which is secured in the back wall of the box. The free end of each of the arms 38, is provided with a pin 40, adapted to engage against the peripheral surface of the magazine 35. To hold the pins 40, clamped against the magazine 35, a spring 41, is engaged around the stud 39, with one end of the spring hooked around one of the arms 38, while the other end of said spring is fastened to the other arm 38, to normally impel said arms toward one another, so that the pins 40, will clamp against the magazine and removably hold the same properly positioned within the magazine box 27.

In the device as shown in Fig. 11, the construction of the tank is identical with that above described. In this case, however, the magazine box 27—28, is omitted and a standard double camera film magazine 42, is placed directly on top of the cover 3, and is removably held secured in place by means of a clamping screw 43, which engages in the threaded cover opening 24. In this case the outlet film slot of the double magazine is placed to register with the cover slot 25, so that the moving picture ribbon film may be threaded from the magazine 42, through the magazine slot and the cover slot 25.

The operation is as follows:

The film tester is portable and may be conveniently carried along with the other moving picture camera equipment when position pictures are to be taken at considerable distances from the studio. The film tester forming a part of the moving picture camera paraphernalia permits short lengths of the exposed camera film to be developed right on a job to ascertain whether or not the picture must be retaken. This arrangement is a means of reducing the expense of taking position pictures since the actors and the equipment required for a picture may be held on a particular job for the retaking of a film, in case the first film is unsatisfactory.

When a film has been taken, the same is left in the camera film magazine 35, which is removed from the moving picture camera and is placed within the box 27, to seat in the grooves provided by the strips 29, 30 and 34. The clamping arms 38, are spread apart to receive the magazine, and the spring 41, which is stressed by separating the arms acts to clamp the pins 40, against the outer periphery of the magazine and thus hold the same in place. Both the box 27 and the frame 17, are secured to the cover 3, and are removable therewith from the tank 1. With the cover removed the end of the film 37, is pulled through the registering slots 31 and 26, and is trained or engaged around the shanks of the various guide rollers 19, and finally over the last or feed roller 21, the teeth of the sprockets 22, engaging in the marginal perforations in the film 37. The end of the film is projected through the discharge slot 16, and the frame 17, is inserted into the tank 1, with the cover 3, seated upon the top of the tank and held clamped in place by means of the spring clamps 2. When positioning the cover on the tank the tongue 23, is of course engaged in the slot of the head 11, to permit the feed roller to be rotated by the driving or feeding mechanism.

With the parts assembled as shown in Fig. 4, the length of film 37, within the tank 1, has half thereof positioned in the developing chamber 5, and half in the fixing chamber 7. The test length of the film passes over the top of the partition 4, from one chamber to the other.

The film is fed through the tank 1, by simply rotating the large gear wheel 13, by means of the handle 15. One turn of the gear wheel 13, is sufficient to feed the length of film disposed around the rollers 19, in the developing chamber 5, into the fixing chamber 7. By rotating the gear wheel 13, the pinion 12, is rotated and a drive is thus imparted to the feed roller 21, the sprockets 22, of which advance or feed the film 37, through the tank and out through the discharge slot 16, completely developed. The exposed film length to be tested in passing through the tank of course first passes in a zigzag path through the developing fluid 6, and then through the hyposulfite solution 8, and is accordingly developed and fixed, so that upon ejection of the test length of the film from the tank 1, the operator can readily ascertain whether the roll of film which has been taken will be satisfactory or not.

A double film camera magazine 42, may be used with the tester, by simply removing the box 27, and securing the magazine upon the cover 3, by means of the clamping screw 43. Before placing the cover 3, upon the tank 1, the end of the film is pulled through the outlet slot in the magazine and through the cover slot 25, and then engaged around the various guide rollers on the frame 17, as hereinbefore described.

Test lengths of films may be readily developed with little expense, and after the tester has been used the developing fluid and the fixing solution may be removed from the tank chambers by opening the respective pet cocks 9.

I am aware that numerous details of construction may be varied through a wide range without departing from the principles of this invention, and I therefore do not purpose limiting the patent granted otherwise than necessitated by the prior art.

I claim as my invention:

1. A portable film tester comprising a tank, a removable cover therefor, a partition in the tank, a plurality of compartments formed by the partition, and means on said cover for conducting a ribbon film through the tank compartments in a circuitous path.

2. A portable film tester comprising a tank having a plurality of chambers therein, means for closing the tank, and a mechanism supported thereon for conducting a ribbon film through said chambers in a circuitous path to develop and then fix the film.

3. A film tester comprising a tank having a developing chamber and a fixing chamber therein, and means projecting into said chambers adapted to conduct a film through said chambers to develop and fix the film.

4. A film tester comprising a tank having a developing chamber and a fixing chamber therein, means for closing the tank, and a roller mechanism supported on said means and projecting into said chambers to conduct a film therethrough.

5. A film tester comprising a double compartment tank, slotted means for closing the tank, and means suspended therefrom for engaging a film passed through the slotted means and carrying the film through the tank compartments to develop and fix the film.

6. A portable film tester comprising a tank, a removable cover therefor, a frame secured to said cover adapted to engage in said tank when the cover is in position, and means on said frame for conducting a ribbon film through said tank in a circuitous path.

7. A portable film tester embracing a tank, a removable cover therefor, a frame secured on the bottom of said cover adapted to project into the tank when the cover is in position to close the tank, guide rollers supported by said frame to conduct a ribbon film through the tank in a circuitous path, and mechanisms on the exterior of said tank whereby one of said rollers may be actuated to feed the film through the tank to develop the film.

8. A film tester embracing a chambered tank adapted to hold a developing and a fixing solution, a removable cover therefor, means on said tank for removably engaging said cover to hold the same in position, a frame secured on said cover adapted to project into the tank chambers, guide rollers on said frame to afford a circuitous path for a film through the tank chambers to bring the film into contact with the developing and fixing solutions, a feed roller mounted on said frame, and gear mechanisms on the exterior of said tank adapted to engage said feed roller to rotate the same and cause feeding of the film through the tank for developing a test length of film.

9. The combination with a portable film tester, of a box mounted thereon, and spring controlled means in said box for removably holding a film magazine in position to permit the film in said magazine to be passed through the tester to be developed.

10. The combination with a portable film tester, of a box removably mounted thereon, clamping means in said box for removably holding a film magazine in position to permit a film from said magazine to be conducted into the film tester, and mechanisms connected with said film tester for feeding the film through the film tester in a circuitous path to permit developing of the film.

11. A film tester comprising a tank, a partition therein to divide the tank into chambers for holding developing and fixing solutions, a pet cock connected with each chamber for draining the solution therefrom, a cover for said tank, means for removably clamping said cover in position, a frame secured to said cover adapted to project into said chambers, guide members supported by said frame, a feed roller also supported by said frame, and means connected with said feed roller to rotate the same to cause a film circuitously entrained around said guide rollers to be fed through the developing and fixing solutions in said chambers to develop and fix the film.

12. A film tester comprising a tank, and means supported therein independently of the tank walls for conducting a film length through the tank.

13. A film tester comprising a tank divided into developing and fixing chambers, a cover closing all of said chambers, a frame secured to said cover adapted to project into all of said chambers, and means connected with said frame for guiding and feeding a film length successively through said chambers in a circuitous path to first develop the film length and then fix the same.

14. A film tester comprising a tank having a developing chamber and a fixing chamber therein, a removable cover for said tank closing both of said chambers, a frame secured to said cover adapted when the cover is in place to project into both of said chambers, film guides on said frame in both of said chambers, a film feed roller also supported on said frame in said fixing chamber, and gear mechanisms on said tank adapted to engage said feed roller to cause a film trained circuitously around said guides in both of said chambers to be fed through said chambers to develop and fix the film.

15. A film developing tank and tester comprising a tank, and a box mounted on the tank, said box having spring-controlled means for removably holding a roll of film therein.

16. A film developing tank and tester comprising a covered developing and fixing tank, and a box mounted on the tank cover, said box having spring-controlled means for removably holding a roll of film therein.

In testimony whereof I have hereunto subscribed my name in the presence of two subscribing witnesses.

JACKSON J. ROSE.

Witnesses:
 EARL M. HARDINE,
 CHARLES W. HILLS, Jr.